US007877446B2

(12) United States Patent
Tamai et al.

(10) Patent No.: US 7,877,446 B2
(45) Date of Patent: Jan. 25, 2011

(54) RECORDING MEDIUM, AND APPARATUS AND METHOD FOR TRANSMITTING E-MAIL

(75) Inventors: Yoshiyuki Tamai, Itami (JP); Kimie Mishima, Itami (JP); Yoshiki Tokimoto, Nishiwaki (JP); Masami Yamada, Sennan-gun (JP)

(73) Assignee: Minolta Company, Ltd., Osaka (JP)

( * ) Notice: Subject to any disclaimer, the term of this patent is extended or adjusted under 35 U.S.C. 154(b) by 923 days.

(21) Appl. No.: 10/648,380

(22) Filed: Aug. 27, 2003

(65) Prior Publication Data

US 2004/0167969 A1   Aug. 26, 2004

(30) Foreign Application Priority Data

Feb. 21, 2003   (JP)   ............................. 2003-043868

(51) Int. Cl.
*G06F 15/16* (2006.01)
(52) U.S. Cl. .................................................. 709/206
(58) Field of Classification Search ................. 709/206; 358/402
See application file for complete search history.

(56) References Cited

U.S. PATENT DOCUMENTS

| 5,974,449 | A * | 10/1999 | Chang et al. ................. 709/206 |
| 2002/0016818 | A1* | 2/2002 | Kirani et al. ................. 709/203 |
| 2002/0169954 | A1* | 11/2002 | Bandini et al. ............... 713/153 |
| 2002/0199119 | A1* | 12/2002 | Dunnion et al. ............. 713/201 |
| 2003/0037261 | A1* | 2/2003 | Meffert et al. ............... 713/201 |
| 2006/0209342 | A1* | 9/2006 | Ferlitsch et al. ............ 358/1.15 |
| 2006/0242311 | A1* | 10/2006 | Mai et al. .................... 709/229 |

FOREIGN PATENT DOCUMENTS

| JP | 05-153159 | 6/1993 |
| JP | 06-350788 | 12/1994 |
| JP | 2001-337901 | 12/2001 |
| JP | 2002-073499 | 3/2002 |
| JP | 2002-082877 | 3/2002 |
| JP | 2002-149574 | 5/2002 |

OTHER PUBLICATIONS

Notification of Reasons for Refusal mailed Mar. 7, 2006, directed to counterpart JP Application No. 2003-043868.
Notification of Reasons for Refusal directed at Japanese Application No. 2003-43868, mailed on Sep. 30, 2008; 30 pages.

* cited by examiner

*Primary Examiner*—Nathan Flynn
*Assistant Examiner*—Chirag Patel
(74) *Attorney, Agent, or Firm*—Morrison & Foerster LLP

(57) ABSTRACT

In a recording medium, a program for making a computer execute processing is stored. The processing includes detecting a recipient's domain name of an e-mail to be transmitted with data attached to the e-mail from a recipient's address of the e-mail, deciding a format of the data depending on the detected recipient's domain name, formatting the data into the decided format, and transmitting the data formatted into the decided format to the recipient's address as an attachment of the e-mail.

12 Claims, 15 Drawing Sheets

| FORMAT / PROPERTY | WITHIN ORGANIZATION | OUTSIDE ORGANIZATION |
|---|---|---|
| APPLICATION DATA | APPLICATION DATA | TIFF |
| PDF DATA | PDF | TIFF |
| TIFF DATA | TIFF | TIFF |

FIG.9

| RESPONSE TIME / FORMAT | LESS THAN 10 msec. | 10 msec. OR MORE |
|---|---|---|
| APPLICATION DATA | APPLICATION DATA | TIFF |
| PDF DATA | PDF | TIFF |
| TIFF DATA | TIFF | TIFF |

FIG.11

| FORMAT / PROPERTY | WITHIN ORGANIZATION | OUTSIDE ORGANIZATION |
|---|---|---|
| APPLICATION DATA | APPLICATION DATA | TIFF |
| PDF DATA | PDF | TIFF |
| TIFF DATA | TIFF | TIFF |

FIG.13

| FORMAT / PROPERTY | CONFIDENTIAL | NON-CONFIDENTIAL |
|---|---|---|
| APPLICATION DATA | APPLICATION DATA | TIFF |
| PDF DATA | PDF | TIFF |
| TIFF DATA | TIFF | TIFF |

FIG.15

RECORDING MEDIUM, AND APPARATUS AND METHOD FOR TRANSMITTING E-MAIL

Priority is claimed to Japanese Patent Application No. 2003-43868, filed on Feb. 21, 2003, the disclosure of which is incorporated by reference in its entirety.

BACKGROUND OF THE INVENTION

1. Field of the Invention

The present invention relates to an electronic mail (hereinafter referred to as "e-mail") transmitting apparatus, an e-mail transmitting method and a recording medium in which a program to make a computer execute processing for transmitting an e-mail with attached data such as document data to a recipient is recorded.

2. Description of Related Art

The following description sets forth the inventor's knowledge of related art and problems therein and should not be construed as an admission of knowledge in the prior art.

In recent years, along with the popularization of the Internet, there increases a chance of sending electronic data as an attachment of an e-mail using a personal computer (hereinafter referred to as "PC") or an Internet facsimile apparatus (hereinafter referred to as "IFAX") from a home or an office.

Even if the contents of the data are the same, in some cases the data can be sent in a format that allows a user to change the contents, but in another cases the data must be sent in a format that does not allow a user to change the contents. For example, in cases where the data is sent from an organization within the same organization to ask a check of the document data, if the data is sent in a format that allows a user to change the contents by using a document application software, the recipient can easily change the contents of the received data.

However, in cases where the data is sent to an organization other than an organization to which the sender belongs, in some cases it is preferable to send the data after converting it into a format such as a TIFF (Tagged Image File Format) format that is difficult to change the contents by a user.

Japanese Laid-open Patent Publication No. 5-153159 discloses an e-mail sending system. According to this technique, the format information that recipients can receive is stored as a data base in advance. At the time of transmitting the data, a sender obtains the format information corresponding to the recipient from the data base, and if the format of the data transmitted from the sender is different from the aforementioned obtained format, the format is automatically converted.

Another technique is disclosed by Japanese Laid-open Patent Publication No. 6-350788. According to this technique, in cases where the format information that the recipient can receive is not stored, the format capable of being received by the recipient is obtained by communicating with the recipient, and the format is converted into the obtained format.

According to the aforementioned conventional technique, it is possible to convert the format of the data attached to an e-mail into a format that can be received by a recipient. However, it was not possible to determine whether the data can be transmitted as an attachment of the e-mail in a format created by the sender. In other words, it was not possible to determine the format of the data to be attached to the e-mail by judging the recipient's property such as whether the recipient belongs to the same organization as that of the sender.

Accordingly, in cases where a recipient is not allowed to change or edit the contents of the data, the sender has to convert the data format, causing a troublesome operation.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

It is an object of the present invention to provide a recording medium in which a program to make a computer execute processing for automatically converting a format of data to be attached to an e-mail into a format corresponding to a recipient's property and transmitting the data in a simple operation is recorded.

It is another object of the present invention to provide an e-mail transmitting apparatus capable of automatically converting a format of data to be attached to an e-mail into a format corresponding to a recipient's property and transmitting the data in a simple operation.

It is still another object of the present invention to provide an e-mail transmitting method capable of automatically converting a format of data to be attached to an e-mail into a format corresponding to a recipient's property and transmitting the data in a simple operation.

According to one aspect of the present invention, a recording medium in which a program for making a computer execute processing is stored, the processing includes:
  detecting a recipient's domain name of an e-mail to be sent with data attached to the e-mail from a recipient's address of the e-mail;
  deciding a format of the data to be attached to the e-mail depending on the detected recipient's domain name;
  formatting the data into the decided format; and
  transmitting the data formatted into the decided format to the recipient's address as an attachment of the e-mail.

According to the second aspect of the present invention, a recording medium in which a program for making a computer execute processing, the processing includes:
  detecting a recipient's domain name of an e-mail to be transmitted with data attached to the e-mail from a recipient's address of the e-mail;
  detecting a recipient's server based on the detected recipient's domain name;
  detecting a response time by executing a connection status searching command against the detected recipient's server;
  deciding a format of the data to be attached to the e-mail depending on the detected response time;
  formatting the data into the decided format; and
  transmitting the data formatted into the decided format to the recipient's address as an attachment of the e-mail.

According to the third aspect of the present invention, a recording medium in which a program for making a computer execute processing, the processing includes:
  receiving a transmission instruction of an e-mail to be transmitted with data attached to the e-mail:
  detecting a recipient's domain name of the e-mail from a recipient's address of the e-mail based on the received transmission instruction;
  detecting a recipient's server based on the detected recipient's domain name;

searching a route to the server by executing a route searching command against the searched server;

discriminating whether a relay server having a prescribed property exists on the detected route;

deciding a format of the data to be attached to the e-mail depending on the discriminated result;

formatting the data into the decided format; and transmitting the data formatted into the decided format to the recipient's address as an attachment of the e-mail.

According to the fourth aspect of the present invention, a recording medium in which a program for making a computer execute processing, the processing includes:

discriminating whether a receiving apparatus of a recipient of an e-mail to be transmitted with data as an attachment is an internet facsimile apparatus and a transmission of the e-mail is confidential;

deciding a format of the data to be attached to the e-mail depending on the discriminated result;

formatting the data into the decided format; and transmitting the data formatted into the decided format to an address of the recipient as an attachment of the e-mail.

According to the fifth aspect of the present invention, an e-mail transmission apparatus includes:

a domain name detecting unit to detect a recipient's domain name of an e-mail to be transmitted with data attached to the e-mail from a recipient's address of the e-mail;

a format deciding unit to decide a format of the data depending on the detected recipient's domain name and to format the data into the decided format; and a transmission processing unit to transmit the data formatted into the format decided by the format deciding unit to the recipient's address as an attachment of the e-mail.

According to the sixth aspect of the present invention, an e-mail transmission apparatus includes:

a domain name detecting unit to detect a recipient's domain name of an e-mail to be transmitted together with data attached to the e-mail from a recipient's address of the e-mail;

a server detecting unit to detect a recipient's server based on the detected recipient's domain name;

a response time detecting unit to detect a response time by executing a connection status searching command against the recipient's server detected by the server detecting unit;

a format deciding unit to decide a format of the data to be attached to the e-mail depending on the detected response time and format the data into the decided format; and a transmission processing unit to transmit the data formatted into the format decided by the format deciding unit to the recipient's address as an attachment of the e-mail.

According to the seventh aspect of the present invention, an e-mail transmission apparatus includes:

a domain name detecting unit to detect a recipient's domain name of an e-mail to be transmitted together with data attached to the e-mail from a recipient's address of the e-mail;

a server detecting unit to detect a recipient's server based on the detected recipient's domain name;

a route detecting unit to detect a route to the recipient's server by executing a route searching command against the detected server and discriminate whether a relay server having a prescribed property exists on the detected route;

a format deciding unit to decide a format of the data to be attached to the e-mail depending on the discriminated result and format the data into the decided format; and a transmission processing unit to transmit the data formatted into the decided format decided by the format deciding unit to the recipient's address as an attachment of the e-mail.

According to the eighth aspect of the present invention, an e-mail transmission apparatus includes:

a discrimination unit to discriminate whether a receiving apparatus of a recipient of an e-mail to be transmitted together with data an attachment is an internet facsimile apparatus and a transmission of the e-mail is confidential;

a format deciding unit to decide a format of the data to be attached to the e-mail depending on the discriminated result and format the data into the decided format; and a transmission unit to transmit the data formatted into the decided format decided by the format deciding unit to a recipient's address as an attachment of the e-mail.

According to the ninth aspect of the present invention, an e-mail transmitting method includes:

detecting a recipient's domain name of an e-mail to be transmitted with data attached to the e-mail from a recipient's address of the e-mail;

deciding a format of the data depending on the detected recipient's domain name;

formatting the data into the decided format; and transmitting the data formatted into the decided format to the recipient's address as an attachment of the e-mail.

According to the tenth aspect of the present invention, an e-mail transmitting method includes:

detecting a recipient's domain name of an e-mail to be transmitted together with data attached to the e-mail from a recipient's address of the e-mail;

detecting a recipient's server based on the detected recipient's domain name;

detecting a response time by executing a connection status searching command against the detected recipient's server;

deciding a format of the data to be attached to the e-mail depending on the detected response time;

formatting the data into the decided format; and transmitting the data formatted into the decided format to the recipient's address as an attachment of the e-mail.

According to the eleventh aspect of the present invention, an e-mail transmitting method includes:

detecting a recipient's domain name of an e-mail to be transmitted with data attached to the e-mail from a recipient's address of the e-mail;

detecting a recipient's server based on the detected recipient's domain name;

searching a route to the recipient's server by executing a route searching command against the detected recipient's server;

discriminating whether a relay server having a prescribed property exists on the searched route;

deciding a format of the data to be attached to the e-mail depending on the discriminated result;

formatting the data into the decided format; and transmitting the data formatted into the decided format to the recipient's address as an attachment of the e-mail.

According to the twelfth aspect of the present invention, an e-mail transmitting method includes:

discriminating whether a receiving apparatus of a recipient of an e-mail to be transmitted with data as an attachment is an internet facsimile apparatus and a transmission of the e-mail is confidential;

deciding a format of the data to be attached to the e-mail depending on the discriminated result;

formatting the data into the decided format; and transmitting the data formatted into the decided format to an address of the recipient as an attachment of the e-mail.

Other objects and the features will be apparent from the following detailed description of the present invention with reference to the attached drawings.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The accompanying figures are provided by way of example, without limiting the broad scope of the invention or various other embodiments, wherein:

FIG. 9 illustrates a storing table showing the relationship between the format of the data and the property in the processing shown in FIG. 8;

FIG. 11 illustrates a storing table showing the relationship between the format of the data and the response time in the processing shown in FIG. 10;

FIG. 13 illustrates a storing table showing the relationship between the format of the data and the property in the processing shown in FIG. 12;

FIG. 15 illustrates a storing table showing the relationship between the format of the data and the property in the processing shown in FIG. 14.

DETAILED DESCRIPTION OF THE PREFERRED EMBODIMENTS

Figure 1:
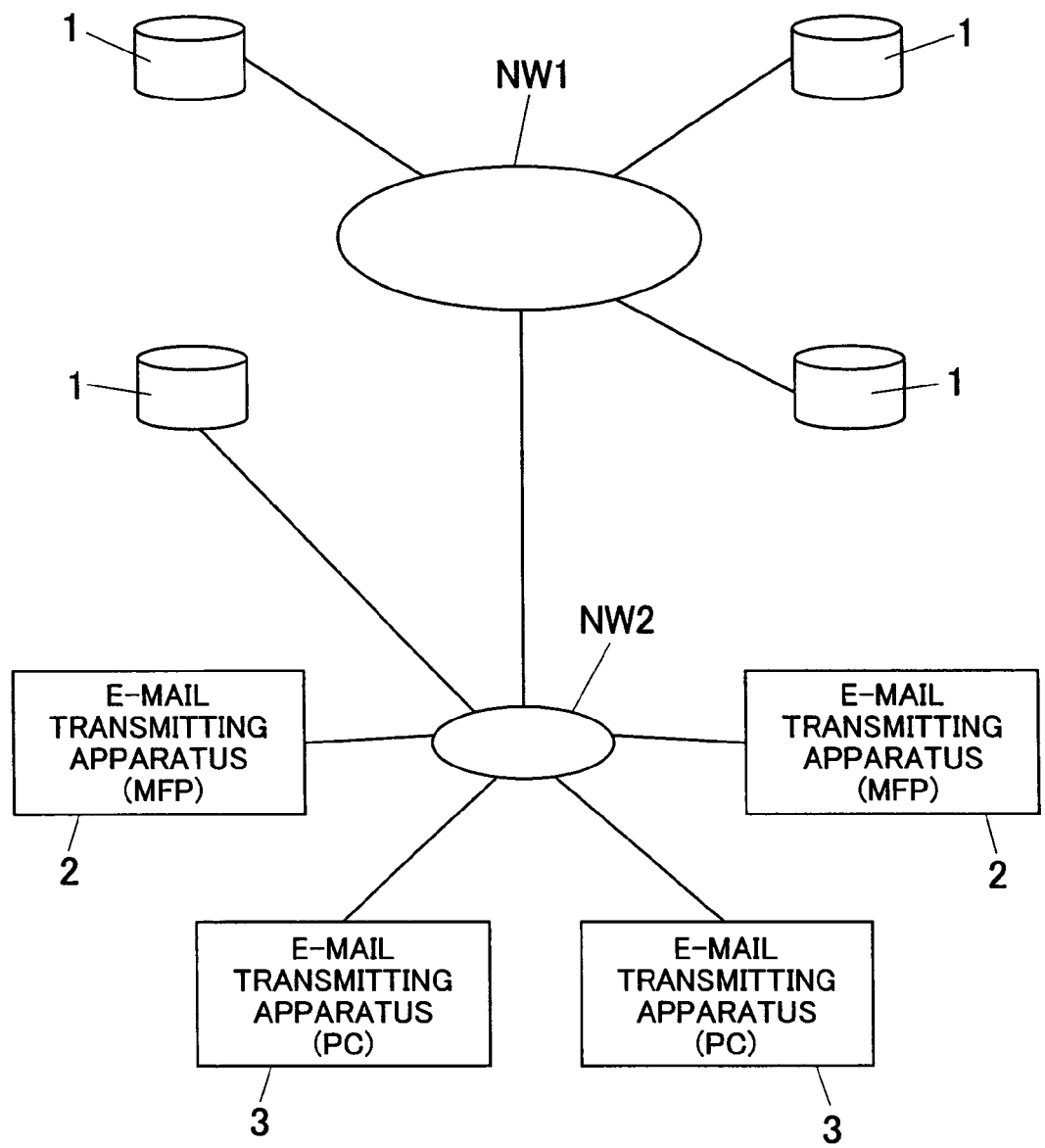
FIG. 1 is a structural view showing an e-mail transmitting system to which an e-mail transmitting apparatus according to one embodiment of the present invention is applied.

FIG. 1 is a structural view showing an e-mail transmitting/receiving system to which an e-mail transmitting apparatus according to one embodiment of the present invention is applied.

As shown in FIG. 1, the e-mail transmitting/receiving system is provided with a network NW1 and a network NW2 connected with each other. Connected to the network NW1 are a plurality of mail servers 1, and connected to the network NW2 are a mail server 1 and a plurality of e-mail transmitting apparatuses 2 and 3. Accordingly, each of the e-mail transmitting apparatus 2 and 3 is connected to the mail servers 1 and another e-mail transmitting apparatuses via the networks 1 and 2.

The e-mail transmitting apparatus 2 (3) is constituted by a MFP (Multi Function Product) equipped with a network connecting function, a copying function, a facsimile function, a printer function, a scanner function, etc., or a copying apparatus or a PC equipped with a network connecting function. In this embodiment, a MFP equipped with a network connecting function is exemplified as the e-mail transmitting apparatus 2, and a PC equipped with a network connecting function is exemplified as the e-mail transmitting apparatus 3.

The following explanation is directed to the case in which the e-mail transmitting apparatus 2 is constituted by a MFP equipped with a network connecting function.

Embodiment 1

Figure 2:
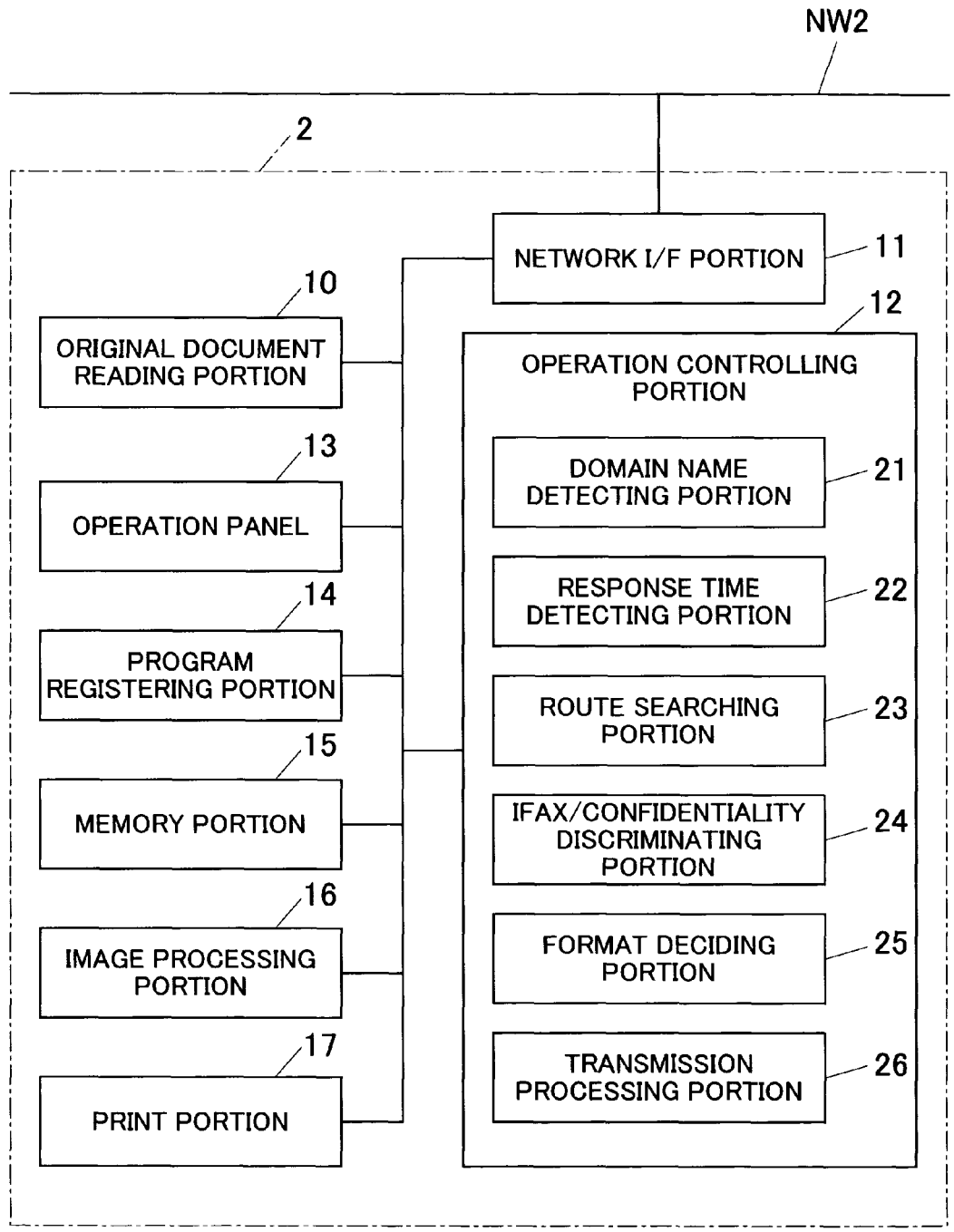
FIG. 2 is a block diagram showing an electrical structure of the e-mail transmitting apparatus which is a MFP.

FIG. 2 is a block diagram showing the electrical structure of the e-mail transmitting apparatus (MFP) 2.

The e-mail transmitting apparatus 2 is provided with an original document reading portion 10, a network I/F (interface) portion 11, an operation controlling portion 12, an operation panel 13, a program registering portion 14, a memory portion 15, an image processing portion 16 and a print portion 17.

The original document reading portion 10 is configured to read various paper original documents with an image sensor and obtain the original document image as image data.

The network I/F portion 11 is an interface for transmitting/receiving data or signals among the mail servers 1 and another e-mail transmitting apparatus 2 and 3 via the networks NW1 and NW2.

The operation controlling portion 12 is provided with a CPU and generally controls the entire e-mail transmitting apparatus 2. For example, the operation controlling portion 12 receives a transmission instruction from a user (sender) or transmits an e-mail to a recipient address via the network I/F portion 11 by executing a program stored in the program registering portion 14 such as a hard disk or a rewritable ROM. Furthermore, the operation controlling portion 12 is equipped with various discriminating functions and detecting functions. More concretely, the operation controlling portion 12 is equipped with a domain name detecting portion 21, a response time detecting portion 22, a route searching portion 23, an IFAX/confidentiality discriminating portion 24, a format deciding portion 25 and a transmission processing portion 26.

The domain name detecting portion 21 is configured to detect the domain name of the recipient's e-mail address and discriminate whether the detected domain name is the same domain name as the domain name of the sender's e-mail address, etc.

The response time detecting portion 22 is configured to detect a response time by executing a connection status searching command such as a ping command against the recipient's name server (DNS server) obtained based on the detected domain name.

The route searching portion 23 is configured to search whether a server whose organization is different from the organization of the sender (e.g., external server) exists on the route between the sender and the name server by executing a route searching command such as a traceroute, tracert command against the recipient's name server obtained by the domain name detected by the domain name detecting portion 21.

The IFAX/confidentiality discriminating portion 24 is configured to discriminate whether the recipient's receiving apparatus is an IFAX and whether the transmission instructed by the sender is a confidential transmission which allows only a specified recipient to read the e-mail.

The format deciding portion 25 is configured to decide the format of the data to be attached to the e-mail based on each discrimination result or detected result of the domain name detecting portion 21, the response time detecting portion 22, the route searching portion 23 and the IFAX/confidentiality discriminating portion 24, and to convert the format of the image data to be attached to the e-mail into the format decided via the image processing portion 16.

The transmission processing portion 26 is configured to transmit the e-mail to the recipient's address by the network /F portion 11.

The operation panel 13 is provided with a key operating portion and a display portion. The key operating portion is used to input various operation instructions for selecting an e-mail transmission or an IFAX transmission, specifying and registering a recipient or specifying a confidential transmission. The display portion is used to display input contents or received mails.

The program registering portion 14 is configured to store a program to specify the operation of the e-mail transmitting apparatus 2. This program registering portion 14 can be constituted by various computer readable recording mediums, such as a hard disc, a CD-ROM, a DVD, a floppy-disc and various semiconductor memories.

The memory portion 15 is configured to store data to be transmitted or e-mail addresses, and has a recording table which is referred to by the format deciding portion 25 at the time of deciding the format.

The image processing portion 16 is configured to perform image processing of transmitting data, received data, image data from the original document reading portion 10 and the like. In cases where image data read by the original document reading portion 10 is transmitted as an attachment of an e-mail, the read image data is converted into PDF (Portable Document Format) data or TIFF data in accordance with the instruction of the format deciding portion 25.

The print portion 17 is configured to print transmitting data or received data.

The operation of the e-mail transmitting apparatus 2 shown in FIGS. 1 and 2 will be explained every embodiment with reference to the respective flowcharts. In the following explanations and drawings, "Step" will be abbreviated as "S."

Embodiment 1-1

Figure 3:
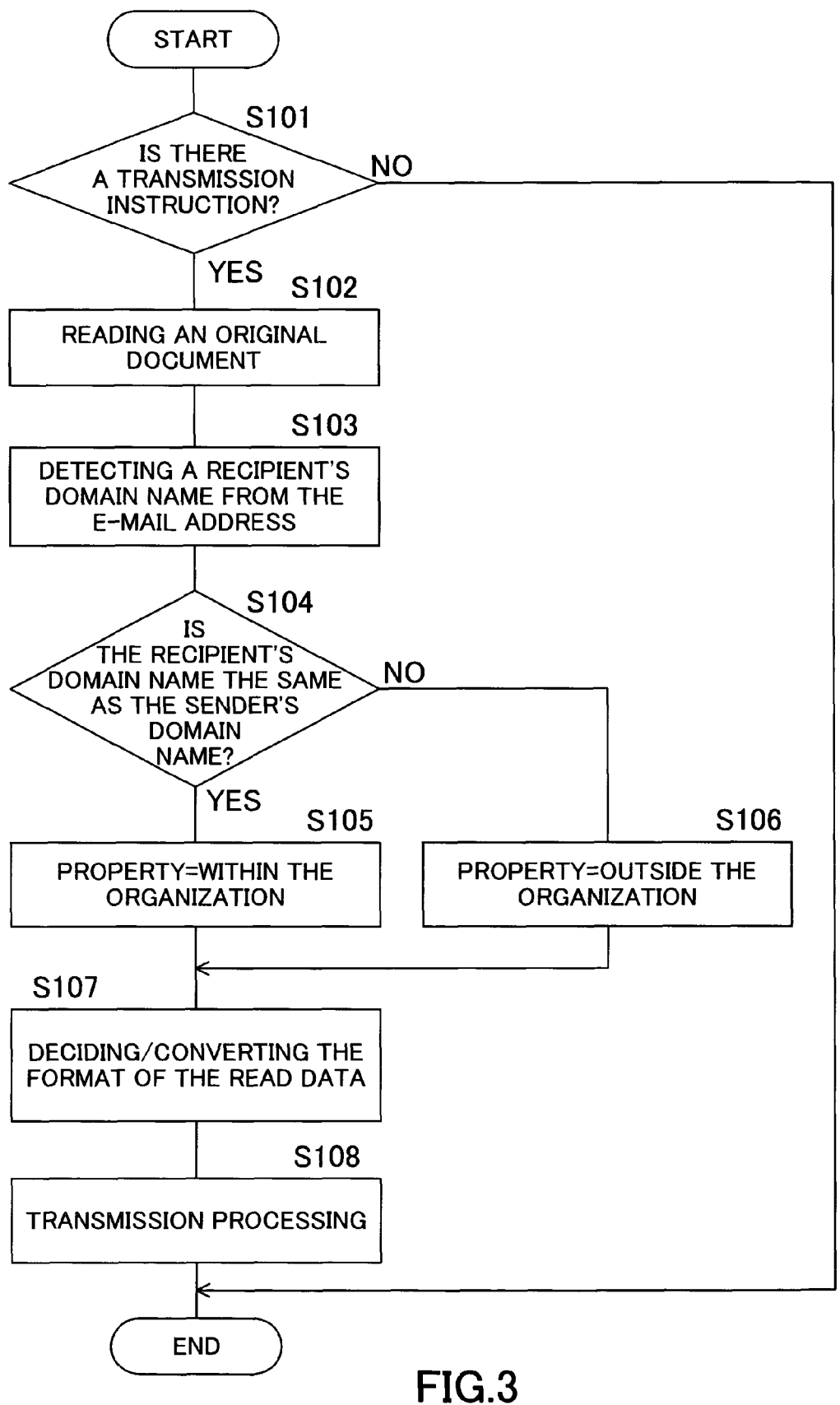
FIG. 3 is a flowchart showing the flow of the processing for detecting the domain name of the recipient and deciding the format of the data to be sent to the recipient in the e-mail transmitting apparatus shown in FIG. 2.

FIG. 3 is a flowchart showing the flow of the processing executed by the operation controlling portion 12 in which the domain name is detected from the recipient's e-mail address and then the format of the data to be attached to the e-mail is decided.

The sender issues a transmission instruction of an e-mail by specifying the recipient address via the operation panel 13.

At S101, it is discriminated whether there is a transmission instruction of an e-mail via the operation panel 13 from the sender. For example, it is discriminated whether there is an instruction such as an instruction to read the original document image and transmit the read image data as an attachment of the e-mail or transmit the read image data as an IFAX.

If there is a transmission instruction (Yes at S101), at S102, the original document reading apparatus 10 reads the original document. If there is no transmission instruction (No at S101), the routine terminates.

Subsequently, at S103, the domain name detecting portion 21 detects the recipient's domain name from the recipient's e-mail address. Thereafter, at S104, it is discriminated whether the detected domain name is the same domain name as that of the sender. If both the domain names are the same (Yes at S104), at S105, it is discriminated that the property of the recipient is the same as that of the sender's organization (i.e., within the same company), and the routine proceeds to S107. If both the domain names are not the same (No at S104), at S106, it is discriminated that the property is "external organization" (e.g., outside the company), and the routine proceeds to S107.

At S107, based on the storing table stored in the memory portion 15, the format deciding portion 25 decides the format of the data at the time of the transmission and converts the format of the read data into the decided format.

In this embodiment, if the property is "within the organization," the read data is converted into PDF data. To the contrary, if the property is "outside the organization," the read data is converted into TIFF formatted image data whose data contents cannot be easily changed or edited by the recipient user.

At S108, the transmission processing portion 26 transmits the e-mail to which the data in a format corresponding to the property is attached to a specified e-mail address via the network I/F portion 11. Thereafter, the processing is terminated.

As will be understood from the above, so long as the sender instructs his/her e-mail transmitting apparatus 2 to send the e-mail, the e-mail transmitting apparatus 2 discriminates the property of the recipient based on the domain name and transmits the data by converting it into the format corresponding to the property. Therefore, the operation of the sender can be simplified.

Embodiment 1-2

Figure 4:
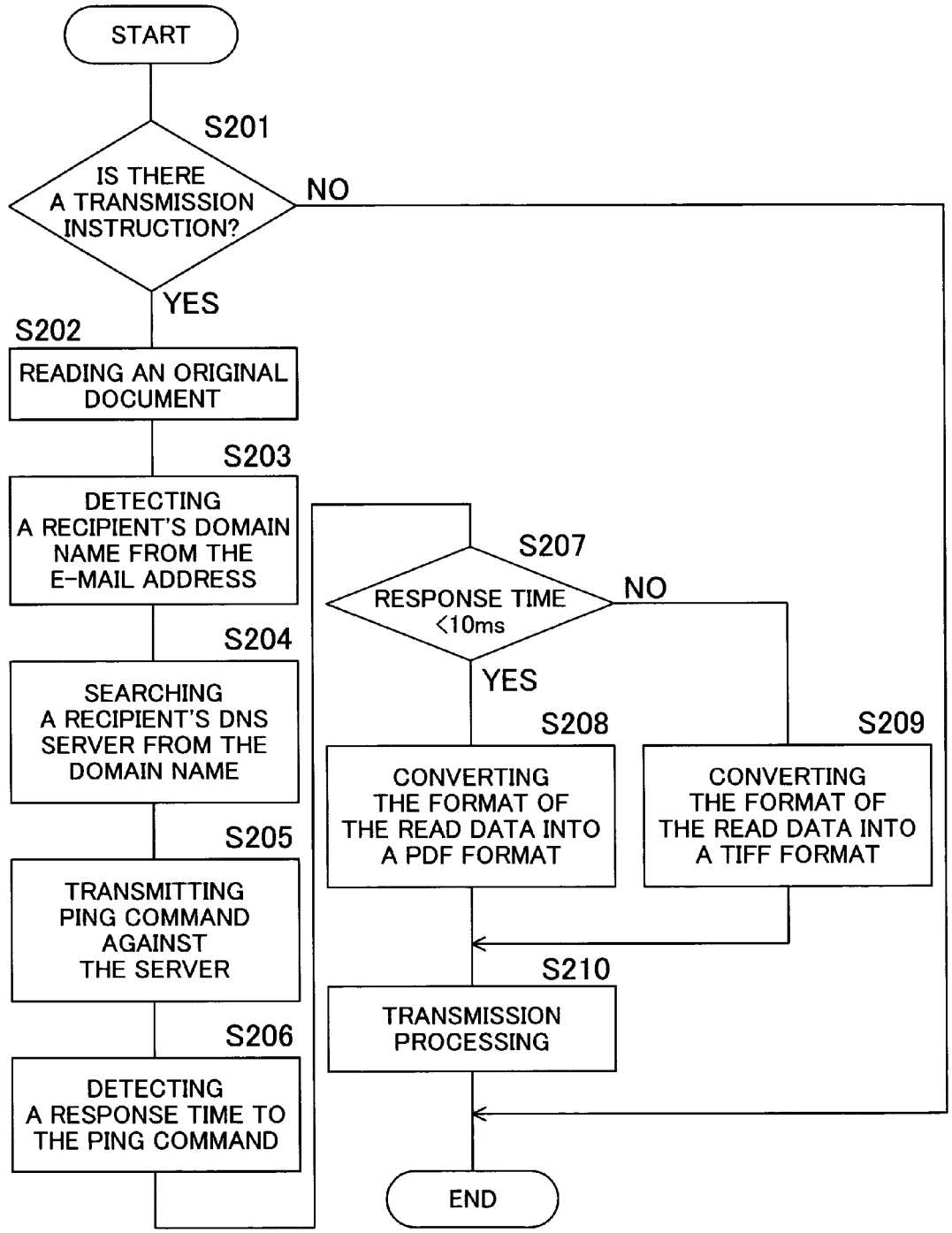
FIG. 4 is a flowchart showing the flow of processing for detecting a response time of Ping and deciding the format of the data to be sent to the recipient in the e-mail transmitting apparatus shown in FIG. 2.

FIG. 4 is a flowchart showing the flow of the processing executed by the operation controlling portion 12 in which a Ping command, which is one example of connection status searching commands, is executed and the format of the data to be attached to the e-mail is decided based on the response time. The Ping command is one of TCP/IP tools for confirming the connection status of the Internet.

At S201, it is discriminated whether there is a transmission instruction from a sender. If there is a transmission instruction (Yes at S201), at S202, the original document is read by the reader 10. If there is no transmission instruction (No at S201), the routine terminates.

Subsequently, at S203, the domain name detecting portion 21 detects the recipient's domain name from the recipient e-mail address.

At S204, the recipient name server (DNS serve: Domain Name Server) is searched from the detected domain name. This search can be performed by using a database of an administrative organization or an administrative association administering domain names, such as Syadanhouzin (i.e., aggregate corporation) Japan Network Information Center (JPNIC).

After the completion of the name server searching, at S205, the response time detecting portion 22 executes the Ping command against the name server, and then the response time is detected at S206. Then, the routine proceeds to S207.

At S207, it is discriminated whether the detected response time is less than 10 msec. If the recipient and the sender belong to the same property (organization), it is considered that both domain names are the same and the corresponding name servers are the same. Therefore, the response time becomes shorter. To the contrary, if the recipient and the sender are different in property (organization), it is often the case that the name servers are different. Therefore, the response time becomes longer since it takes a time for the command to arrive the name server. Accordingly, in this embodiment, the format is decided based on whether the response time exceeds 10 msec.

That is, if the response time is less than 10 msec. (Yes at S207), the format deciding portion 25 converts the format of the read data into a PDF format at S208. To the contrary, if the response time exceeds 10 msec. (No at S207), the format deciding portion 25 converts the format of the read data into a TIFF format at S209.

Then, at S210, the transmission processing portion 26 attaches the data of the converted format to the e-mail and transmits the e-mail to a specified e-mail address. Thereafter, the routine terminates.

In this embodiment too, so long as the sender instructs his/her e-mail transmitting apparatus 2 to send the e-mail, the e-mail transmitting apparatus 2 detects the response time by executing the connection status searching command and transmits the data in the format corresponding to the property. Therefore, the operation of the sender can be simplified.

Embodiment 1-3

Figure 5:
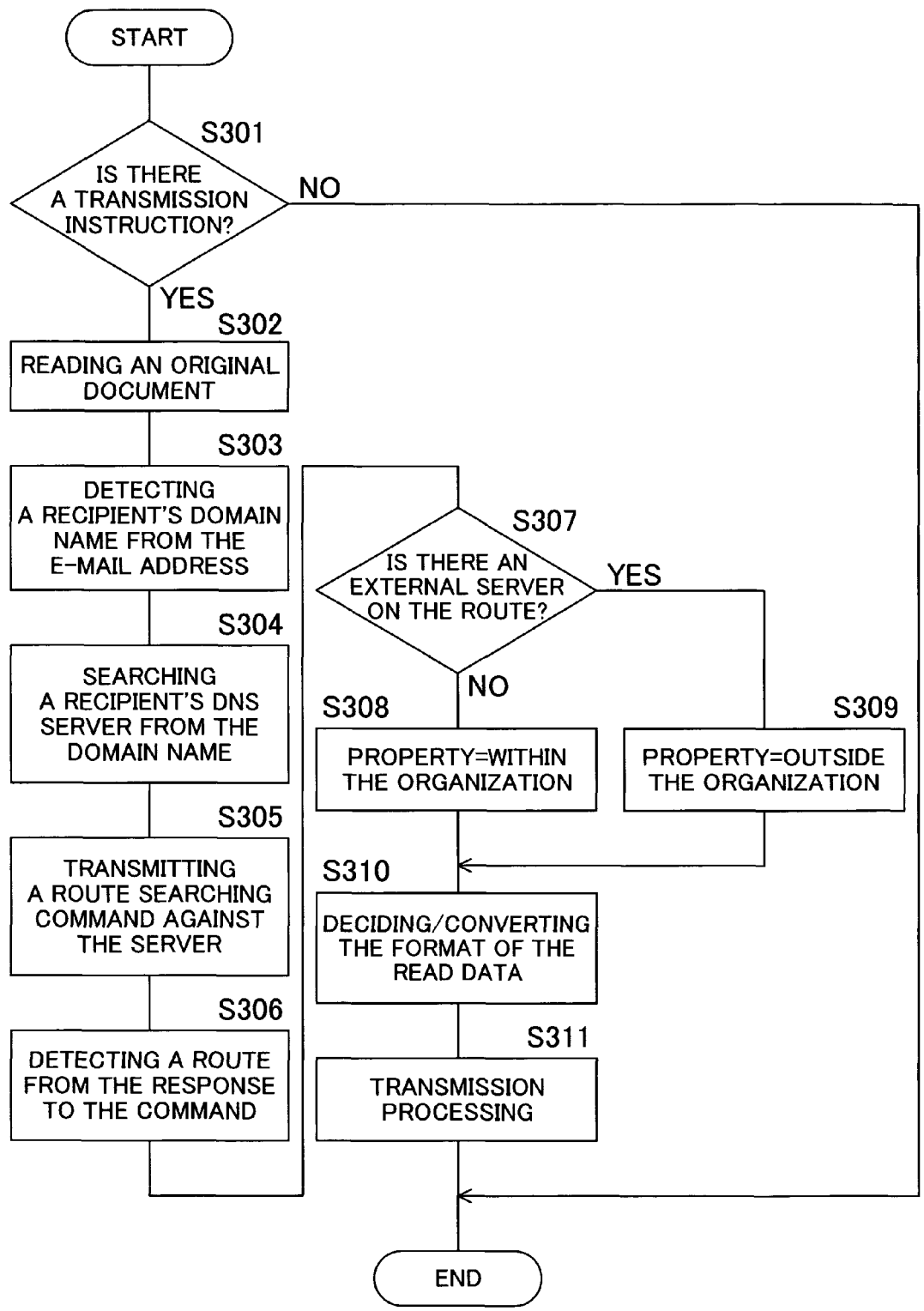
FIG. 5 is a flowchart showing the flow of processing for detecting a transmitting route of the e-mail and deciding the format of the data to be sent to the recipient in the e-mail transmitting apparatus shown in FIG. 2.

FIG. 5 is a flowchart showing the flow of the processing executed by the operation controlling portion 12 in which the route to the recipient server is searched to decide the format of data.

At S301, it is discriminated whether there is a transmission instruction from a sender. If there is a transmission instruction (Yes at S301), at S302, the original document is read by the original document reader 10. If there is no transmission instruction (No at S301), the routine terminates.

Subsequently, at S303, the domain name detecting portion 21 detects the recipient's domain name from the recipient e-mail address.

At S304, the recipient name server (DNS server) is searched from the detected domain name. This search can be performed by using a database of an administrative organization or an administrative association administering domain names in the same manner as in the aforementioned embodiment 1-2.

After the completion of the name server searching, at S305, the route searching portion 23 executes a route searching command, such as a traceroute command or a tracert command, against the name server. Subsequently, at S306, after detecting the route based on the response to the command, at S307, it is discriminated whether there exists an outside (another organization) server on the route. This discrimination can be performed by searching an organization to which the relay server belongs from the aforementioned database of a domain name administrative organization based on the server name or IP address of each relayed server.

If no external server exists on the route (No at S307), at S308, it is discriminated that the property is "internal," and then the routine proceeds to S310. If an external server exists on the route (Yes at S307), it is discriminated that the property is "external," and then the routine proceeds to S310.

At S310, based on the storing table stored in the memory portion 15, the format deciding portion 25 decides the format of the data at the time of the transmission and converts the format of the read data into the decided format.

In this embodiment, if the property is "internal," the read data is converted into a PDF data. To the contrary, if the property is "external," the read data is converted into a TIFF formatted image data.

At S311, the transmission processing portion 26 transmits the e-mail to which the data in a format corresponding to the property is attached to a specified e-mail address. Thereafter, the processing is terminated.

In this embodiment too, the e-mail transmitting apparatus 2 searches the route between the sender and the recipient's name server, and discriminates the property of the external server based on whether an external server exist on the route, and transmits the data in a format corresponding to the property. Therefore, the operation of the sender can be simplified.

Embodiment 1-4

Figure 6:
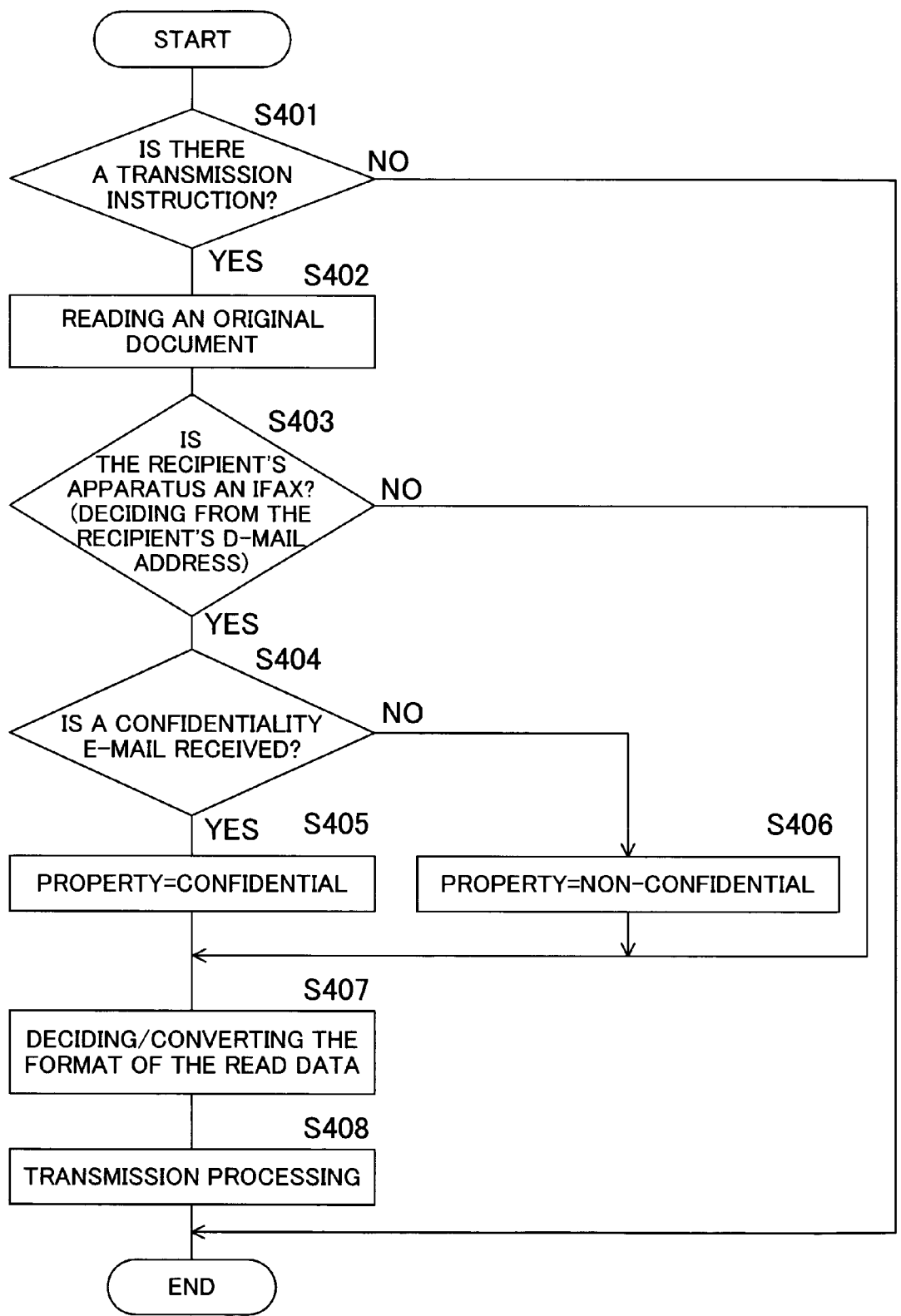
FIG. 6 is a flowchart showing the flow of processing in cases where the recipient is using an IFAX in the e-mail transmitting apparatus shown in FIG. 2.

FIG. 6 is a flowchart showing the flow of the processing executed by the operation controlling portion 12 in which a format of data to be attached to an e-mail is decided depending on whether the receiving apparatus of the recipient is an IFAX and the transmission is a confidential transmission.

At S401, it is discriminated whether there is a transmission instruction from a sender. If there is a transmission instruction (Yes at S401), at S402, the original document is read by the original document reader 10. If there is no transmission instruction (No at S401), the routine terminates.

Subsequently, at S403, the IFAX/Confidentiality discriminating portion 24 discriminates whether the receiving apparatus of the recipient is an IFAX based on the recipient's e-mail address. If the recipient's receiving apparatus is an IFAX (Yes at S403), the routine proceeds to S404. If the recipient's receiving apparatus is not an IFAX (No at S403), the routine proceeds to S407.

At S404, the IFAX/Confidentiality discriminating portion 24 discriminates whether information showing that the transmission is a "confidential transmission" which allows only a specified recipient to receive is attached to the e-mail address itself or the text of the e-mail. If information showing the "confidential transmission" is attached (Yes at S404), it is discriminated that the property is "confidential" at S405 and the routine proceeds to S407. To the contrary, if information showing the "confidential transmission" is not attached (No at S404), it is discriminated that the property is "non-confidential" at S406, and the routine proceeds to S407.

At S407, based on the storing table stored in the memory portion 15, the format deciding portion 25 decides the format of the data at the time of the transmission and converts the format of the read data into the decided format.

For example, if the property is "confidential," the read data is converted into PDF data. To the contrary, if the property is "non-confidential," the read data is converted into TIFF formatted image data. In cases where the recipient's receiving apparatus is not an IFAX, the read data is also converted into TIFF formatted image data.

At S408, the transmission processing portion 26 transmits the e-mail to which the data in a format corresponding to the property is attached to a specified e-mail address. Thereafter, the processing is terminated.

However, in cases where the recipient can receive only TIFF formatted image data, the data is transmitted in TIFF format regardless of the property.

In this embodiment too, the e-mail transmitting apparatus 2 discriminates whether the transmission is a "confidential transmission" to an IFAX, and transmits the data in the appropriate format. Therefore, the operation of the sender can be simplified.

In the aforementioned embodiments 1-1 to 1-4, it is configured that the original document reading portion 10 reads the original document when a transmission instruction is made. However, it can be configured such that: the original document is read before the transmission instruction and the read original document data is stored in the memory portion 15 in a PDF format; image data to be transmitted at the time of the transmission instruction is read out from the memory portion; and the image data is transmitted in the PDF format, or converted into a TIFF format depending on the recipient's property and then transmitted.

Embodiment 2

The next explanation will be directed to the case where the e-mail transmission apparatus is an e-mail transmission apparatus 3 consisting of a PC equipped with a network connecting function in FIG. 1.

Figure 7:
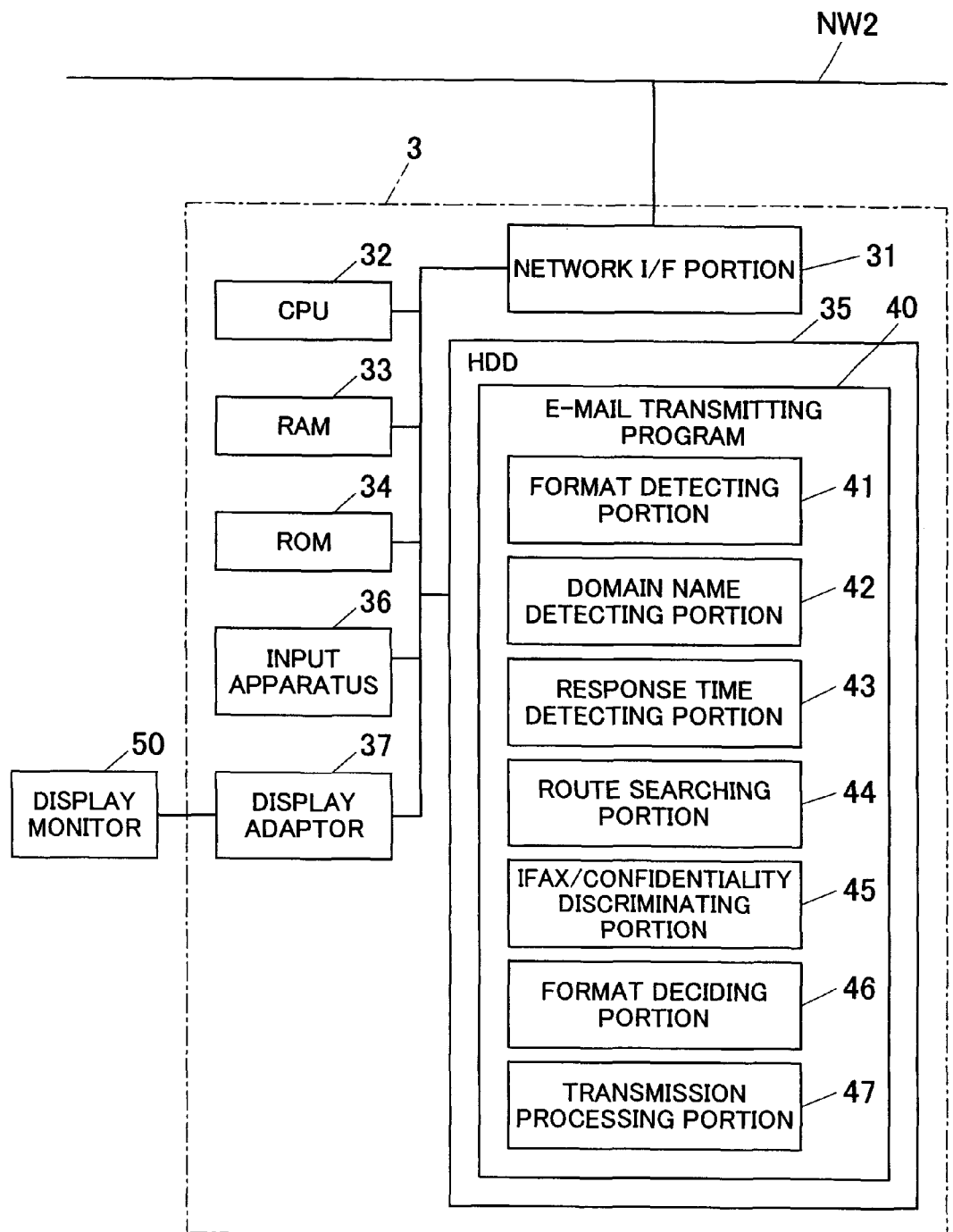
FIG. 7 is a block diagram showing an electrical structure of a PC as an e-mail transmitting apparatus.

FIG. 7 is a block diagram showing the electrical structure of the e-mail transmitting apparatus (PC) 3.

The e-mail transmitting apparatus 3 is provided with a network I/F portion 31, a CPU 32, a RAM 33, a ROM 34, a hard disk apparatus (HDD) 35, and an input apparatus 36 and a display adapter 37.

The network I/F portion 31 is an interface for transmitting/receiving data or signals among the e-mail servers 1 and the e-mail transmitting apparatus 2 and 3 via the networks NW1 and NW2.

The CPU 32 controls the entire e-mail transmitting apparatus 3. For example, the CPU receives a transmission instruction sent from a user (sender) via the input apparatus 36 or transmits an e-mail to a recipient via the network I/F portion 11 by executing a program 40 stored in the hard disc apparatus 35.

The RAM 33 functions as a working area used by the CPU for executing the program.

In the ROM 34, a table showing the relationship between the kinds of format of image data and data format at respective recipients is previously stored.

Stored in the hard disc apparatus 35 are an e-mail transmitting program 40 other than various programs such as various application software, application data created by the application software or various data, e-mail addresses.

This e-mail transmitting program 40 makes the CPU function as a means for discriminating/detecting various things. Concretely, the program 40 is provided with a format detecting portion 41, a domain name detecting portion 42, a response time detecting portion 43, a route searching portion 44, an IFAX/confidentiality discriminating portion 45, a format detecting portion 46 and a transmission processing portion 46.

The format detecting portion 41 makes the CPU function as a means for detecting the format of data attached to an e-mail at the time of transmitting the e-mail with the attached data.

The domain name detecting portion 42 detects the domain name of the recipient's e-mail address and makes the CPU 32 function as a means for discriminating whether the detected domain name is the same domain name as the domain name of the sender's e-mail address, etc.

The response time detecting portion 43 makes the CPU function as a means for detecting the response time by executing a connection status searching command such as a ping command against the recipient's name server (DNS server) obtained based on the detected domain name.

The route searching portion 44 makes the CPU 32 function as a means for searching whether a server whose organization is different from the organization of the sender (e.g., external server) exists on the route between name servers by executing a route searching command such as a traceroute, tracert command against the recipient's name server obtained by the domain name detected by the domain name detecting portion 42.

The IFAX/confidentiality discriminating portion 45 makes the CPU 32 function as a means for discriminating whether the recipient's receiving apparatus is an IFAX and whether the transmission instructed by the sender is a confidential transmission which allows only a specific person to read the e-mail.

The format deciding portion 46 makes the CPU 32 function as a means for deciding the format of the data to be attached to the e-mail based on each discrimination result or detected result of the domain name detecting portion 42, the response time detecting portion 43, the route searching portion 44 and the IFAX/confidentiality discriminating portion 45, and to convert the image data to be attached to the e-mail into the format decided via the image processing portion 41.

The transmission processing portion 47 makes the CPU 32 function as a means for transmitting the e-mail to the recipient's address via the network I/F portion 31.

The input apparatus 36 is provided with a key board or a mouse for inputting various operation instructions to select an e-mail transmission or an IFAX transmission, specify and register a recipient or specify a confidential transmission.

The display adaptor 37 is used to connect the e-mail transmitting apparatus 3 to the display monitor 50.

The operation of the e-mail transmitting apparatus 3 shown in FIG. 7 will be explained every embodiment with reference to the respective flowcharts.

Embodiment 2-1

Figure 8:
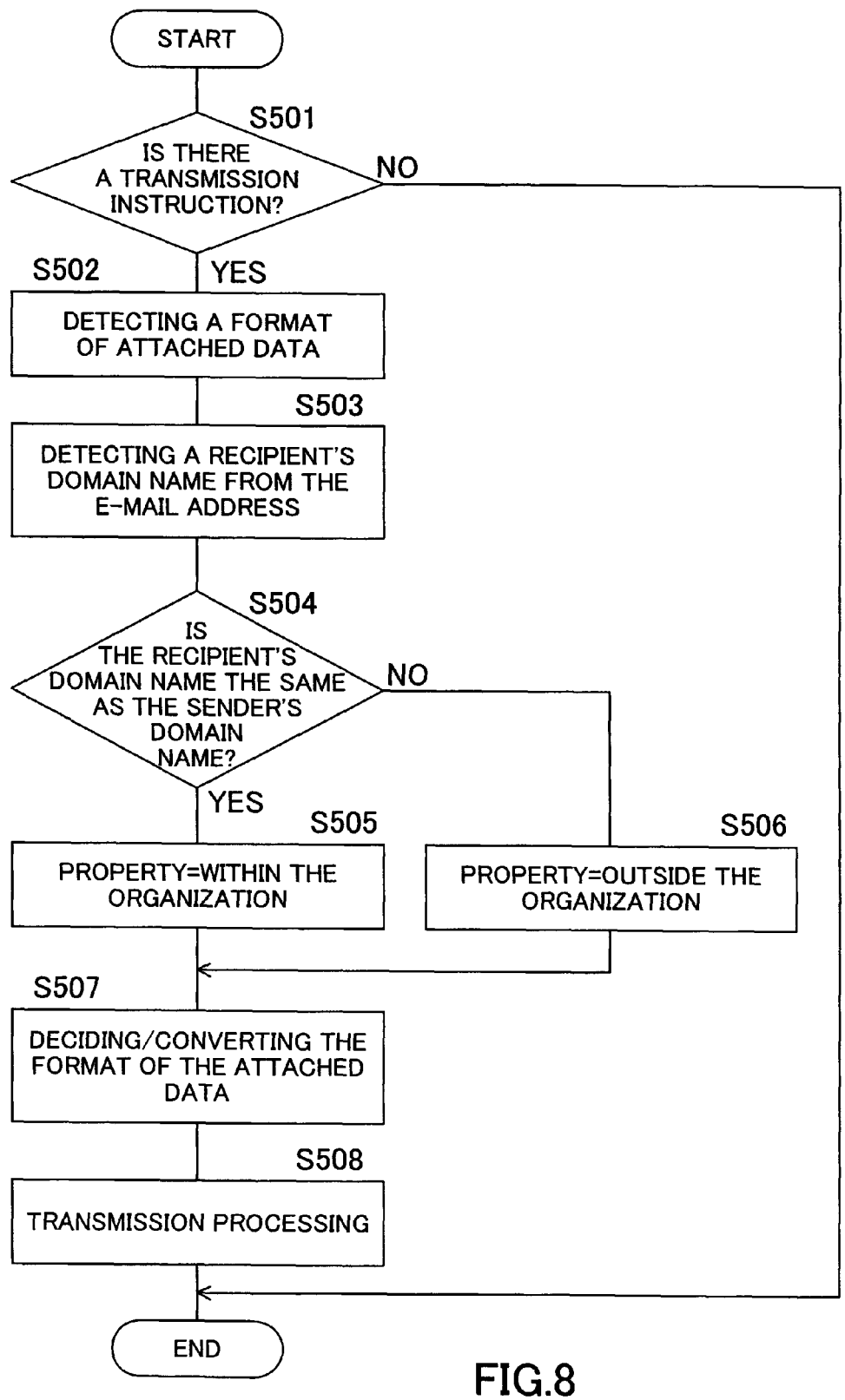
FIG. 8 is a flowchart showing the flow of the processing for detecting the domain name of the recipient and deciding the format of the data to be sent to the recipient in the e-mail transmitting apparatus shown in FIG. 7.

FIG. 8 is a flowchart showing the flow of the processing executed by the CPU 32 in accordance with the e-mail transmitting program 40 stored in the hard disc apparatus 35 in which the domain name is detected from the recipient's e-mail address and then the format of the data to be attached to the e-mail is decided.

At S501, it is discriminated whether there is a sender's transmission instruction of an e-mail to the e-mail transmitting apparatus 3. For example, it is discriminated whether there is an instruction such as an instruction to transmit the data such as application data stored in the hard disc apparatus 35 as an attachment to a normal e-mail or transmit the data as an IFAX. If there is a transmission instruction (Yes at S501), at S502, the format of the data to be attached to the e-mail is detected. If there is no transmission instruction (No at S501), the routine terminates.

Subsequently, at S503, the recipient's domain name is detected from the recipient's e-mail address. Thereafter, at S504, it is discriminated whether the detected domain name is the same domain name as that of the sender. If both the domain names are the same (Yes at S504), at S505, it is discriminated that the property of the recipient is the same as that of the sender's organization (i.e., within the same company), and the routine proceeds to S507. If both the domain names are not the same (NO at S504), at S506, it is discriminated that the property is "external organization (e.g., outside the company), and the routine proceeds to S507.

At S507, based on the storing table shown in FIG. 9 stored in the ROM 34, the format of the data at the time of the transmission is decided, and converted into the decided format if necessary.

For example, in cases where the original format of the data is an application data format such as a document data format, a PDF format or a TIFF format, the property is within the "organization," the format remains as the original format. Therefore, the user can easily perform the changing or the editing of the transmitted document data, etc. To the contrary, if the property is "outside the organization," the application data and the PDF data are converted into TIFF formatted image data whose data contents cannot easily be changed or edited by the recipient user.

At S508, the e-mail to which the data in a converted format or original format is attached is transmitted to a specified e-mail address via the network I/F portion 31. Thereafter, the processing is terminated.

As will be understood from the above, so long as the sender instructs his/her e-mail transmitting apparatus 3 to send the e-mail, the e-mail transmitting apparatus 3 discriminates the property of the recipient based on the domain name and transmits the data by converting it into the format corresponding to the property. Therefore, the operation of the sender can be simplified.

Embodiment 2-2

Figure 10:
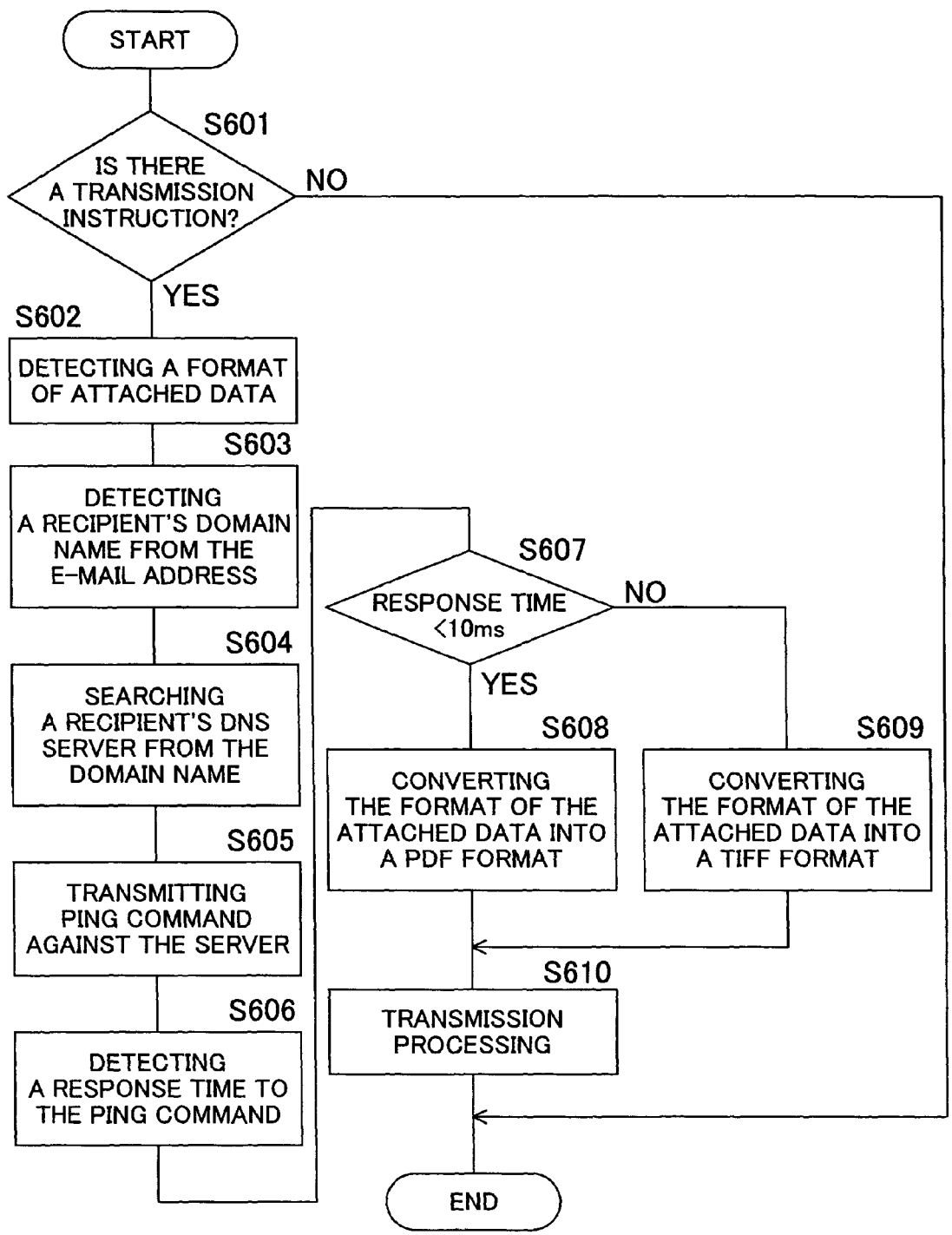
FIG. 10 is a flowchart showing the flow of processing for detecting a response time of Ping and deciding the format of the data to be sent to the recipient in the e-mail transmitting apparatus shown in FIG. 7.

FIG. 10 is a flowchart showing the flow of the processing executed by the CPU 32 in accordance with the e-mail transmitting program 40 stored in the hard disc apparatus 35 in which a Ping command, which is a tool of TCP/IP to confirm the Internet connection status, is executed as one example of the connection status search commands and the format of the data to be attached to the e-mail is decided based on the response time.

At S601, it is discriminated whether there is a transmission instruction from a sender. If there is a transmission instruction (Yes at S601), at S602, the format of the attached data is detected. If there is no transmission instruction (No at S601), the routine terminates.

Subsequently, at S603, the recipient's domain name is detected from the recipient e-mail address.

Next, at S604, the recipient name server (DNS server: Domain Name Server) is searched from the detected domain name. This search can be performed by using a database of an administrative organization or an administrative association administering domain names, such as Syadanhouzin (i.e., aggregate corporation) Japan Network Information Center (JPNIC).

After the completion of the name server searching, at S605, the Ping command is executed against the name server, and then the response time is detected at S606. Then, the routine proceeds to S607.

At S607, it is discriminated whether the detected response time is less than 10 msec. If the recipient and the sender belong to the same property (organization), it is considered that both domain names are the same and the corresponding name servers are the same. Therefore, the response time becomes shorter. To the contrary, if the recipient and the sender are different in property (organization), it is often the case that the name servers are different. Since it takes a time for the command to arrive the name server, the response time becomes longer. Therefore, in this embodiment, the format is decided based on whether the response time exceeds 10 msec.

That is, if the response time is less than 10 msec. (Yes at S607), the format of the data remains as it is based on the storing table shown in FIG. 11 stored in the ROM 34 at S608. To the contrary, if the response time exceeds 10 msec. (No at S607), the format of the application data and the PDF data are converted into a TIFF format at S609.

Then, at S610, the e-mail to which the data in the converted format or the original format is attached is transmitted to a specified e-mail address. Thereafter, the routine terminates.

In this embodiment too, so long as the sender instructs his/her e-mail transmitting apparatus 3 to send the e-mail, the e-mail transmitting apparatus 3 detects the response time by executing the connection status searching command and transmits the data in the format corresponding to the property. Therefore, the operation of the sender can be simplified.

Embodiment 2-3

Figure 12:
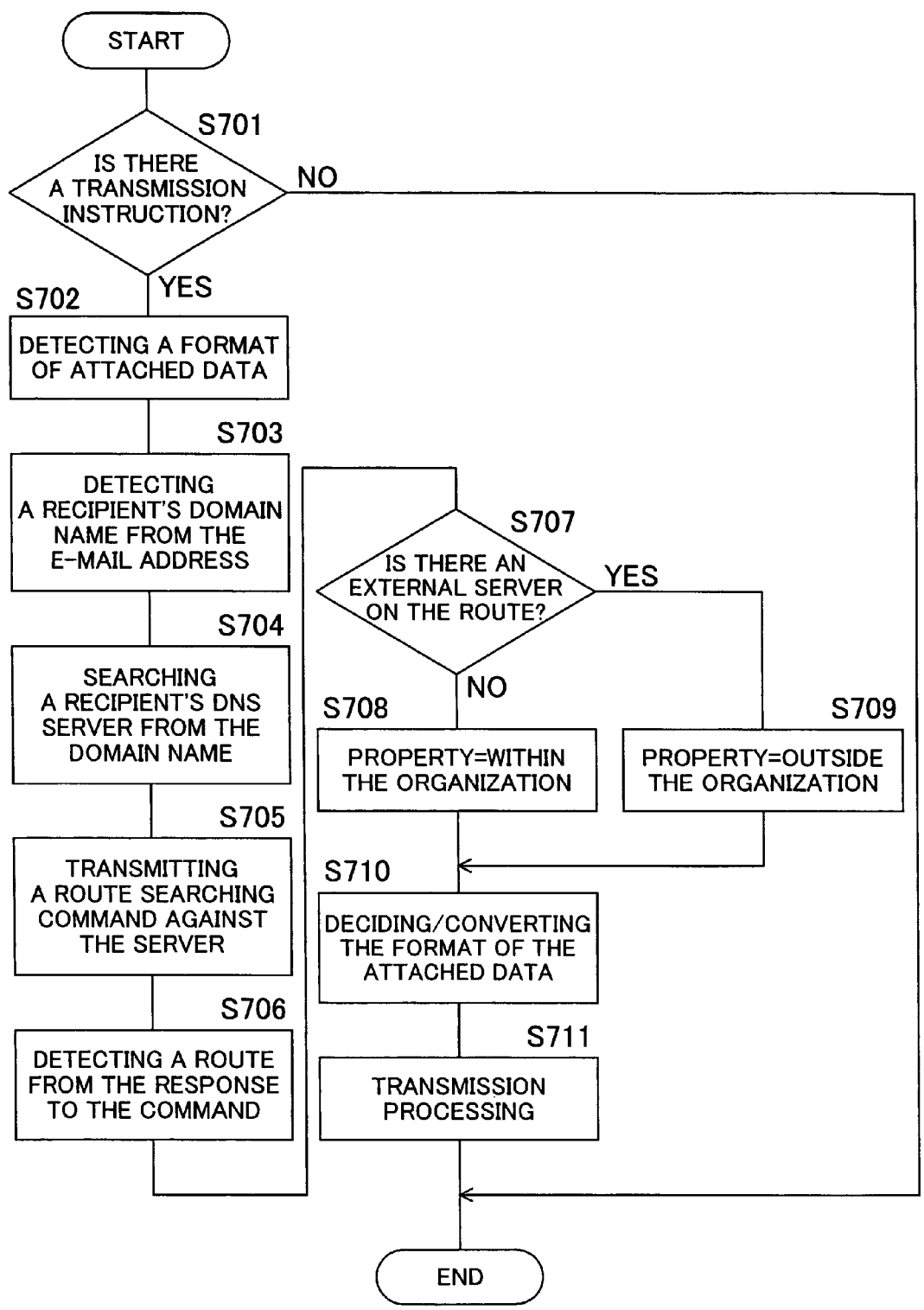
FIG. 12 is a flowchart showing the flow of processing for detecting a transmitting route of the e-mail and deciding the format of the data to be sent to the recipient in the e-mail transmitting apparatus shown in FIG. 7.

FIG. 12 is a flowchart showing the flow of the processing executed by the CPU 32 in accordance with the e-mail transmitting program 40 stored in the hard disc apparatus 35 in which the route to the recipient server is searched to decide the format of data.

At S701, it is discriminated whether there is a transmission instruction to the e-mail transmitting apparatus 3 from a sender. If there is a transmission instruction (Yes at S701), at S702, the format of the attached data is detected at S702. If there is no transmission instruction (No at S701), the routine terminates.

Subsequently, at S703, the recipient's domain name is detected from the recipient e-mail address.

At S704, the recipient name server (DNS server) is searched based on the detected domain name. This search can be performed by using a database of an administrative organization or an administrative association administering domain names in the same manner as in the aforementioned embodiment 2-2.

After the completion of searching the name server, at S705, a route searching command, such as a traceroute command or a tracert command, is executed against the name server. Subsequently, at S706, after detecting the route from the response to the command, at S707, it is discriminated whether there exists an external (another organization) server on the route. This discrimination can be performed by searching an organization to which the relay server belongs from the aforementioned database of a domain name administrative organization based on the server name or the IP address of each relayed server.

If no external server exists on the route (No at S707), at S708, it is discriminated that the property is "internal," and then the routine proceeds to S710. If an external server exists on the route (Yes at S707), it is discriminated that the property is "external," and then the routine proceeds to S710.

At S710, based on the storing table stored in the ROM 34, the format of the data at the time of the transmission is decided, and converted into the decided format if necessary.

For example, in cases where the original format of the data is a format of an application data such as document data, a PDF format or a TIFF data format, if the property is "internal," a conversion of the format is not executed. However, if the property is "external," the application data or PDF data is converted into TIFF formatted image data whose data contents cannot easily be changed or edited by the recipient user.

At S711, the e-mail to which the data in a converted format or original format is attached is transmitted to a specified e-mail address. Thereafter, the processing is terminated.

In this embodiment too, the e-mail transmitting apparatus 3 discriminates the property of the external server based on whether an external server exist on the route by searching the route between the sender and the recipient name server, and transmits the data in a format corresponding to the property. Therefore, the operation of the sender can be simplified.

Embodiment 2-4

Figure 14:
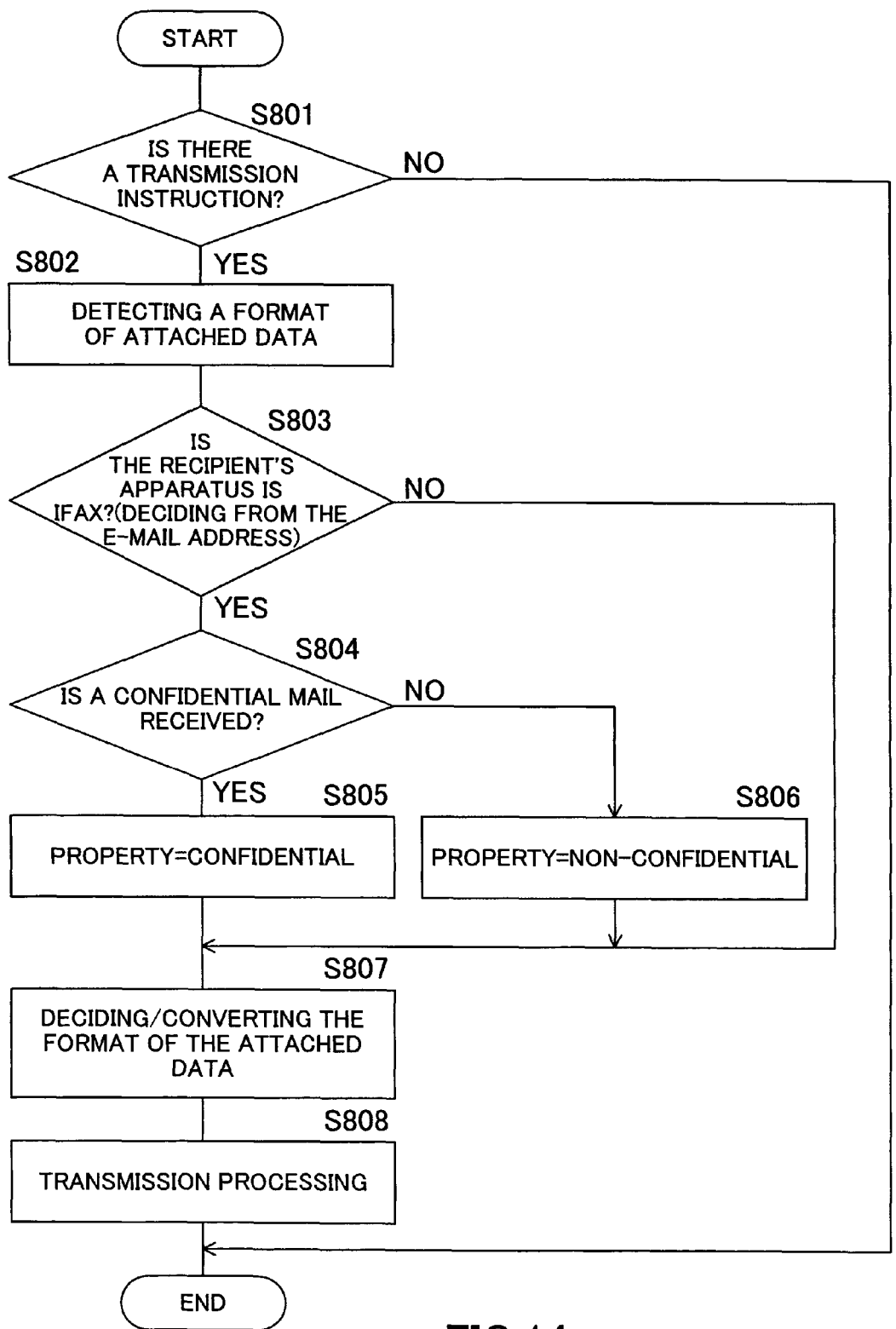
FIG. 14 is a flowchart showing the flow of processing in cases where the recipient is using an IFAX in the e-mail transmitting apparatus shown in FIG. 7.

FIG. 14 is a flowchart showing the flow of the processing executed by the CPU 32 in which a format of data to be attached to an e-mail is decided depending on whether the receiving apparatus of the recipient is an IFAX and the transmission is a confidential transmission.

At S801, it is discriminated whether there is a transmission instruction of an e-mail to the e-mail transmitting apparatus 3 from a sender. If there is a transmission instruction (Yes at S801), at S802, the format of the attached file is detected. If there is no transmission instruction (No at S801), the routine terminates.

Subsequently, at S803, it is discriminated whether the receiving apparatus of the recipient is an IFAX based on the recipient's e-mail address. If the recipient's receiving apparatus is an IFAX (Yes at S803), the routine proceeds to S804. If the recipient's receiving apparatus is not an IFAX (No at S803), the routine proceeds to S807.

At S804, it is discriminated whether information showing that the transmission is a "confidential transmission" which allows only a specified recipient to receive is attached to the e-mail address itself or the text of the e-mail. If information showing the "confidential transmission" is attached (Yes at S804), it is discriminated that the property is "confidential" at S805 and the routine proceeds to S807. To the contrary, if information showing the "confidential transmission" is not attached (No at S804), it is discriminated that the property is "non-confidential" at S806 and the routine proceeds to S807.

At S807, based on the storing table shown in FIG. 15 stored in the Rom 34, the format of the data at the time of the transmission is decided and converted into the decided format if necessary.

For example, in cases where the original format of the data is an application data format, a PDF format or a TIFF format, if the property is "confidential," the conversion of the data format is not performed. However, if the property is "non-confidential," the application data and the PDF data are converted into TIFF formatted image data. Accordingly, in this embodiment, the confidential recipient can easily change the editing or changing the application data, etc. Although the storing table shown in FIG. 15 does not include the cases where the recipient is not an IFAX, the application data or PDF data are converted into image data in TIFF format.

At S808, the e-mail to which the data in a converted format or original format is attached is transmitted to a specified e-mail address. Thereafter, the processing is terminated.

However, in cases where the recipient can receive only a TIFF formatted image data, the data is transmitted in TIFF format regardless of the property. In cases where the recipient can receive TIFF or PDF formatted image data, the data is transmitted by converting it into a PDF format when the application data is transmitted as it is.

In this embodiment too, the e-mail transmitting apparatus 3 discriminates whether the transmission is a "confidential transmission" to an IFAX, and transmits the data in the appropriate format. Therefore, the operation of the sender can be simplified.

In the aforementioned embodiments 1 and 2, the explanation is directed to the cases where an e-mail is transmitted to one recipient together with attached data. However, in cases where data is simultaneously transmitted to a plurality of recipients, an e-mail can be transmitted in such a manner that any one of the processing of the embodiments 1-1 to 1-4 against each recipient is executed to decide the format corresponding to each recipient, and then the e-mail is transmitted together with the attached data in each format.

Furthermore, in cases where even if the data of the decided format is transmitted the recipient cannot receive the data by the format, the format can be converted into a format which can be received by the recipient.

Furthermore, in place of executing the connection status searching command or the route searching command against the recipient's name server, the command can be executed against another server capable of being obtained a response.

In the above explanation, the e-mail transmitting apparatus 2 is provided with a function capable of executing each of the embodiments 1-1 to 1-4, and the e-mail transmitting apparatus 3 is provided with a function capable of executing each of the embodiments 2-1 to 2-4. However, the e-mail transmitting apparatus can be provided with a function capable of executing any one, two or three of the embodiments 1-1 to 1-4 or 2-1 to 2-4.

While illustrative embodiments of the present invention have been described herein, the present invention is not limited to the various preferred embodiments described herein, but includes any and all embodiments having modifications, omissions, combinations (e.g., of aspects across various embodiments), adaptations and/or alterations as would be appreciated by those in the art based on the present disclosure. The limitations in the claims are to be interpreted broadly based the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

What is claimed is:

1. A non-transitory recording medium in which a program for making a computer execute processing, the processing, comprising:

detecting a recipient's domain name of an e-mail to be transmitted with data attached to the e-mail from a recipient's address of the e-mail;
detecting a recipient's server based on the detected recipient's domain name;
detecting a response time of the detected recipient's server;
deciding a format of the data to be attached to the e-mail depending on the detected response time;
re-formatting the data into the decided format if the current format of the data is different from the decided format;
attaching one of the re-formatted data having the decided format or the current format data having the decided format as an attachment to the e-mail; and
transmitting one of the re-formatted data having the decided format or the current format data having the decided format to the recipient's address as the attachment of the e-mail,
wherein the decided format relates to limiting the ability of a user associated with the email to electronically handle the data.

2. A non-transitory recording medium in which a program for making a computer execute processing, the processing, comprising:
receiving a transmission instruction of an e-mail to be transmitted with data attached to the e-mail:
detecting a recipient's domain name of the e-mail from a recipient's address of the e-mail based on the received transmission instruction;
detecting a recipient's server based on the detected recipient's domain name;
searching a route to the detected server;
discriminating whether a relay server having a prescribed property exists on the detected route;
deciding a format of the data to be attached to the e-mail depending on the discriminated result;
re-formatting the data into the decided format if the current format of the data is different from the decided format;
attaching one of the re-formatted data having the decided format or the current format data having the decided format as an attachment to the e-mail; and
transmitting one of the re-formatted data having the decided format and the current format data having the decided format to the recipient's address as the attachment of the e-mail,
wherein the decided format relates to limiting the ability of a user associated with the email to electronically handle the data.

3. The non-transitory recording medium as recited in claim 1, wherein, in cases where the data is transmitted simultaneously to a plurality of recipients, the program stored in the recording medium makes the computer decide the format of the data every recipient and format the data into respective decided formats.

4. The non-transitory recording medium as recited in claim 2, wherein, in cases where the data is transmitted simultaneously to a plurality of recipients, the program stored in the recording medium makes the computer decide the format of the data every recipient and format the data into respective decided formats.

5. The non-transitory recording medium as recited in claim 1, wherein the response time is detected by executing a connection status searching command against the detected server.

6. The non-transitory recording medium as recited in claim 2, wherein the route to the server is searched by executing a route searching command against the server.

7. An e-mail transmission apparatus comprising a processor and comprising:
a domain name detecting unit to detect a recipient's domain name of an e-mail to be transmitted together with data attached to the e-mail from a recipient's address of the e-mail;
a server detecting unit to detect a recipient's server based on the detected recipient's domain name;
a response time detecting unit to detect a response time of the recipient's server detected by the server detecting unit;
a format deciding unit to decide a format of the data to be attached to the e-mail depending on the detected response time and re-format the data into the decided format for attachment to the e-mail if the current format of the data is different from the decided format;
an attachment unit to attach one of the re-formatted data having the decided format or the current format data having the decided format as an attachment to the e-mail; and
a transmission processing unit to transmit one of the re-formatted data having the decided format or the current format data having the decided format to the recipient's address as the attachment of the e-mail,
wherein the decided format relates to limiting the ability of a user associated with the email to electronically handle the data.

8. An e-mail transmission apparatus comprising a processor and comprising:
a domain name detecting unit to detect a recipient's domain name of an e-mail to be transmitted together with data attached to the e-mail from a recipient's address of the e-mail;
a server detecting unit to detect a recipient's server based on the detected recipient's domain name;
a route detecting unit to detect a route to the recipient's server and discriminate whether a relay server having a prescribed property exists on the detected route;
a format deciding unit to decide a format of the data to be attached to the e-mail depending on the discriminated result and re-format the data into the decided format for attachment to the e-mail if the current format of the data is different from the decided format;
an attachment unit to attach one of the re-formatted data having the decided format or the current format data having the decided format as an attachment to the e-mail; and
a transmission processing unit to transmit one of the re-formatted data having the decided format or the current format data having the decided format to the recipient's address as the attachment of the e-mail,
wherein the decided format relates to limiting the ability of a user associated with the email to electronically handle the data.

9. The e-mail transmission apparatus as recited in claim 7, wherein the response time is detected by executing a connection status searching command against the detected server.

10. The e-mail transmission apparatus as recited in claim 8, wherein the route to the server is searched by executing a route searching command against the server.

11. An e-mail transmitting method, comprising:
detecting a recipient's domain name of an e-mail to be transmitted together with data attached to the e-mail from a recipient's address of the e-mail;
detecting a recipient's server based on the detected recipient's domain name;

detecting a response time by executing a connection status searching command against the detected recipient's server;

deciding a format of the data to be attached to the e-mail depending on the detected response time;

re-formatting the data into the decided format if the current format of the data is different from the decided format;

attaching one of the re-formatted data having the decided format or the current format data having the decided format as an attachment to the e-mail; and transmitting one of the re-formatted data having the decided format and the current format data having the decided format to the recipient's address as the attachment of the e-mail, wherein the decided format relates to limiting the ability of a user associated with the email to electronically handle the data.

12. An e-mail transmitting method, comprising:

detecting a recipient's domain name of an e-mail to be transmitted with data attached to the e-mail from a recipient's address of the e-mail;

detecting a recipient's server based on the detected recipient's domain name;

searching a route to the recipient's server by executing a route searching command against the detected recipient's server;

discriminating whether a relay server having a prescribed property exists on the searched route;

deciding a format of the data to be attached to the e-mail depending on the discriminated result;

re-formatting the data into the decided format if the current format of the data is different from the decided format;

attaching one of the re-formatted data having the decided format or the current format data having the decided format as an attachment to the e-mail; and transmitting one of the re-formatted data having the decided format and the current format data having the decided format to the recipient's address as the attachment of the e-mail, wherein the decided format relates to limiting the ability of a user associated with the email to electronically handle the data.

* * * * *